FIG. I.

INVENTORS
JACK A. BROWN
EDWARD H. N. WATSON

Feb. 10, 1959  J. A. BROWN ET AL  2,872,822
GYROSCOPES

Filed Nov. 22, 1957  4 Sheets-Sheet 3

INVENTORS
JACK A. BROWN
EDWARD H. N. WATSON

BY Watson, Cole, Grindle and Watson
ATTORNEYS

INVENTORS
JACK A. BROWN
EDWARD H. N. WATSON

United States Patent Office 2,872,822
Patented Feb. 10, 1959

2,872,822

GYROSCOPES

Jack Alexander Brown and Edward Henry Norman Watson, Hayes, England, assignors to The Fairey Aviation Company Limited, Hayes, England, a British company Application November 22, 1957, Serial No. 698,077

Claims priority, application Great Britain November 26, 1956

11 Claims. (Cl. 74—5.12)

This invention relates to gyroscopes and is concerned with providing an improved mechanism for spinning a gyroscope rotor up to speed whilst a gimbal ring is held erect. The gyroscope may for example be mounted in a missile or other craft which after firing or take-off utilises the gyroscope to control its path. The gyroscope rotor will normally be stationary prior to firing or take-off, but when the moment of launching approaches the gyroscope must be erected and the rotor must be run quickly up to speed. Moreover, whatever member or means is applied to the rotor to spin it up to speed must then be withdrawn clear of the gimbal operating space to allow the gyroscope to function properly when uncaged.

According to the present invention, mechanism for spinning a gimbal-mounted gyroscope rotor comprises a spindle which is capable of being advanced into coaxial engagement with the rotor so as to be coupled coaxially thereto, means for rotating the spindle when so coupled to spin the rotor, and retracting means for automatically retracting the spindle clear of the gimbal ring operating the space when the rotor has been run up to speed.

The present invention provides a mechanism for spinning a gyroscope rotor which may in certain circumstances be made very light and compact, and which moreover has the advantage that the very considerable accelerating torque is applied coaxially to the rotor by the coaxial spindle and so does not give rise to heavy loading of the rotor bearings due to torque reaction.

Conveniently the spindle may be telescopic, one end portion being capable of being extended telescopically from the other end portion into coupling engagement with the rotor and of being retracted telescopically by the retracting means.

Various mechanisms may be employed for causing the rotation of the spindle, for example there may be provided a lead screw coupled to the spindle, or constituted by a part of it, and formed with a quick screwthread, a correspondingly screwthreaded driving nut threaded on to the lead screw and prevented from rotating about its axis, and piston means for driving the nut along the lead screw so as to rotate it and the spindle and thereby to spin the rotor.

In one arrangement the lead screw is mounted inside a pneumatic cylinder whose piston slides on longitudinal guides which prevent its rotation, and the driving nut is secured to or forms part of the piston so that the axial movement of the piston in the cylinder under the pressure of compressed air admitted thereto rotates the lead screw so as to spin the rotor.

To afford a compact arrangement and a suitable velocity ratio, the threaded shaft may conveniently extend alongside and parallel to the spindle and be coupled to it by step-up gearing. Alternatively, however, the lead screw may comprise the outer part of the spindle, the piston and cylinder being mounted coaxially with the spindle.

According to a further feature of the invention the retracting means may be made to retract the spindle automatically after a predetermined number of revolutions of the spindle. For example the retracting means may comprise a catch capable of being locked by a movable locking member in a position in which it holds the spindle engaged with the rotor against the action of return spring means, and a screwthreaded release member caused to move axially along a cooperating screwthread by relative rotation produced by the rotation of the spindle, the release member being arranged by such axial movement to move the locking member into its release position to release the catch after a predetermined number of revolutions of the spindle so as to allow the return spring to withdraw the spindle.

The catch may take the form of a ball catch capable of being locked by an axially movable external locking sleeve surrounding the spindle, and the release member may comprise a nut threaded onto an external screwthread formed on the spindle, the nut being itself prevented from rotation but being free to be moved axially along the spindle by the rotation of the spindle to cause it to engage the locking sleeve and move the latter along the spindle into its release position in which it releases the ball catch.

In another construction, the retracting means may comprise a pneumatic plunger arranged when actuated to withdraw the spindle from the rotor against return spring means, for example by acting on one end of a pivoted lever whose other end engages a flange on the spindle. The plunger may be actuated by causing the pneumatic piston to expose a port at a predetermined point of its stroke and thereby to allow compressed air to pass to the plunger through a conduit leading from the port.

The invention may be carried into practice in various ways but two specific embodiments will now be described by way of example with reference to the accompanying drawing, in which.

Figure 1:
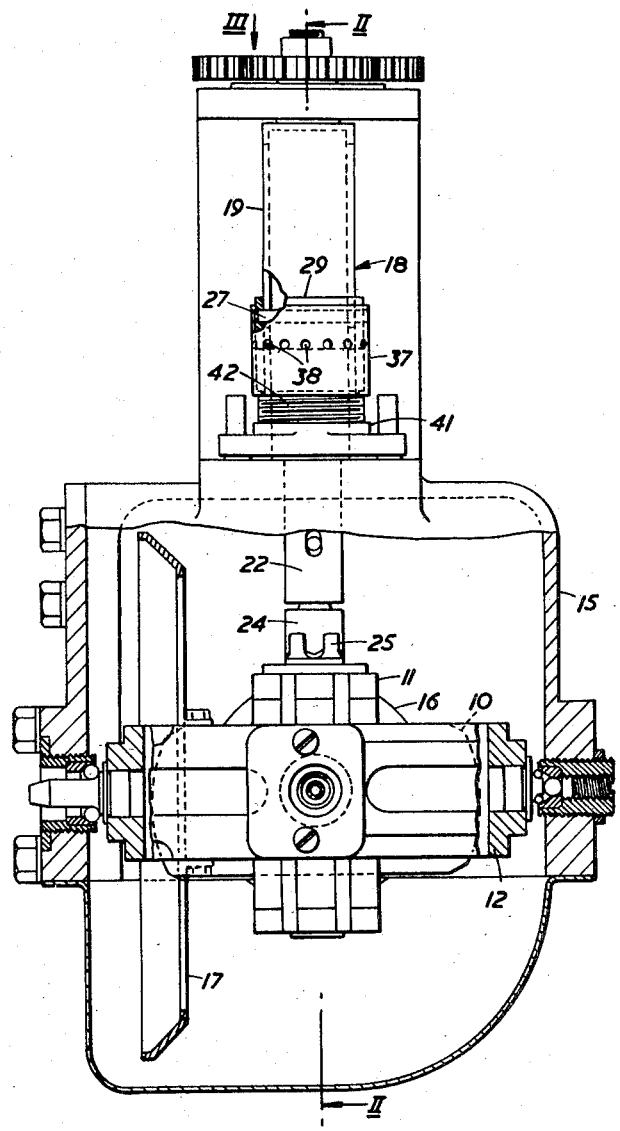
Figure 1 is a side view, partly sectioned, of a gyroscope assembly.
Figure 2:
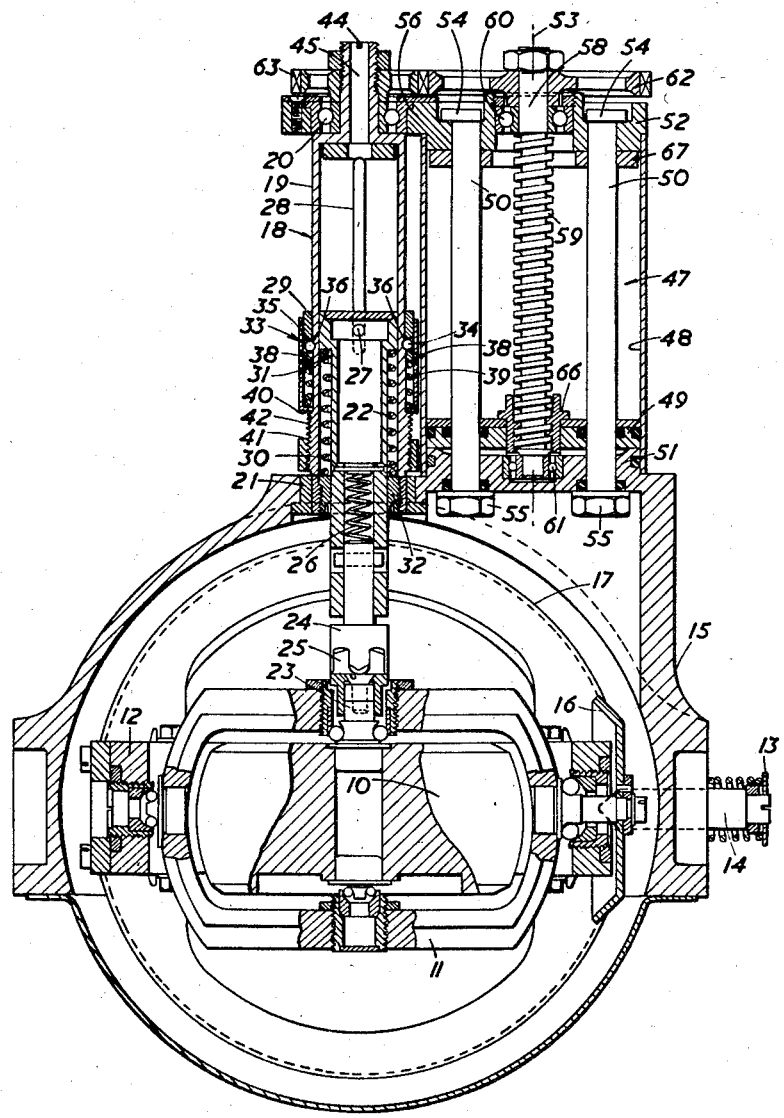
Figure 2 is a cross section on the line II—II of Figure 1.
Figure 3:
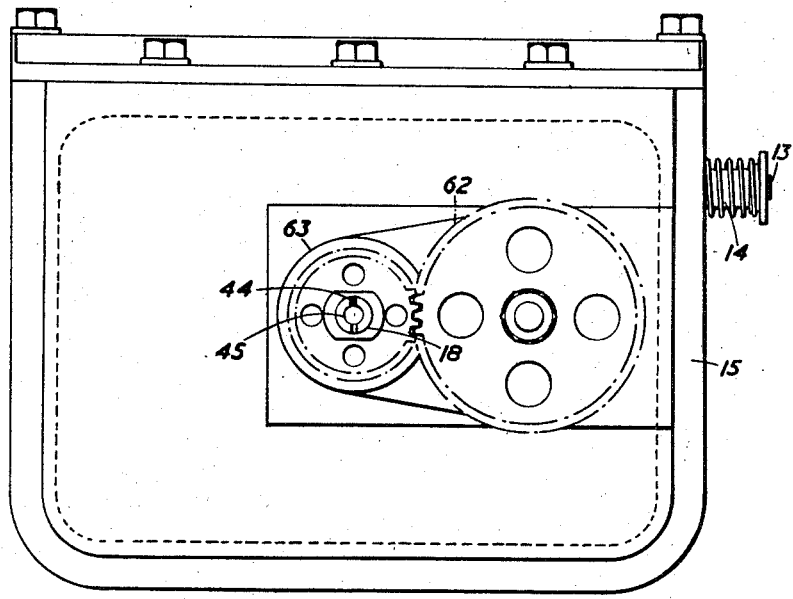
Figure 3 is an end view of the assembly of Figure 1, as seen in the direction of the arrow III of Figure 1.

In the embodiment of Figures 1–3 the invention is applied to a gyroscope for controlling the flight of a missile within whose body the gyroscope is mounted.

The gyroscope is mounted in a frame built into the missile body and comprises essentially a rotor 10 mounted within the frame by means of two gimbal rings, namely an inner gimbal ring 11 and an outer gimbal ring 12, both of which are capable of pivoting about axes which are transverse to each other and transverse to the axis of spin of the rotor 10 mounted in the inner gimbal ring 11. During flight the missile is controlled by means of an earth reference supplied by the gyroscope, which can be erected by the insertion of an instrument such as a screwdriver through an aperture in the casing of the missile into engagement with the slotted head 13 of an erecting plunger 14. It is important to be able to erect the gyroscope from outside the missile and also to be able to spin the rotor a few minutes before the missile is to be fired.

The means provided for erecting the gyroscope comprises a rotatable erecting plunger 14 provided in the gyroscope casing 15 which can be advanced successively into frictional engagement with two bevelled caging rings 16 and 17 respectively secured to the two gimbal rings 11 and 12 coaxially with their pivotal axes. The erecting plunger 14 is rotated (by means of a screw-driver applied to a slot in its head 13) when in contact with the caging ring 17 to rotate the ring and the associated outer gimbal 12 until the plunger encounters a registering gap in the ring 17. The plunger 14 is then advanced further so that it extends through the gap in the ring 17 and so locks the outer gimbal 12 in its erecting position, and the advanced plunger then frictionally engages the bevelled rim of the second caging ring 16. The latter is then rotated by further rotation of the plunger 14 until the plunger engages in a registering gap in the second caging ring 16 to lock the latter and the inner gimbal ring 11 in the erect position. In this way the gyroscope rotor 10 is erected and held in its erect position by the engagement of the plunger 14 in the two registering gaps of the caging rings 16 and 17.

The means for spinning the rotor 10 includes a rotatable telescopic spindle 18 which is formed in two main parts, namely an outer spindle member 19 whose two ends are journalled in bearings 20 and 21 mounted in the frame of the gyroscope casing 15, and an inner spindle member 22 which slides telescopically within the outer member 19 and can be advanced inwardly into engagement with the end of the rotor shaft 23. The whole spindle 18 is so mounted that it is coaxial with the spin axis of the rotor when the gyroscope is set up in its erect position in the missile, and the retractible inner member 22 of the spindle carries one member 24 of a dog clutch, the other member 25 of which is mounted on the end of the rotor shaft 23 so that the spindle member 22 can be advanced and coupled coaxially to the rotor shaft 23 by means of the dog clutch 24, 25. The dog clutch member 24 is resiliently mounted in the inner spindle member 22 by means of a shock-absorbing compression spring 26 contained in the bore of the spindle member 22.

The inner spindle member 22 is pinned to the outer spindle member 19 by means of a transverse pin 27 which extends right through the inner spindle member 22 near its outer end, the two protruding ends of the pin 27 passing through longitudinal slots 28 in the wall of the overlapping outer spindle member 19. These slots 28 enable the inner spindle member 22 to slide telescopically within the outer member 19, the pin 27 engaging in the slots 28 ensuring that the two spindle members 19 and 22 rotate together as a single torque-transmitting unit 18. The two ends of the transverse pin 27 are secured in a cylindrical ring 29 surrounding the outer spindle member 19 to slide up and down it with the inner spindle member 22.

A helical compression spring 30 is situated between the overlapping portions of the inner and outer spindle members 22 and 19 and bears on flanges 31 and 32 at its two ends so as to tend to retract the inner spindle member 22 telescopically within the outer member 19. A ball catch indicated generally at 33 is provided to hold the inner spindle member 22 in its advanced position engaging the rotor shaft 23, but when the catch 33 is released the return spring 30 retracts the inner spindle member 22 from the rotor shaft 23 to a position in which its tip, bearing the dog clutch member 24, is clear of the space required for rotation of the gimbal rings 11 and 12 relatively to the frame and to the missile. The ball catch 33 is constituted by a number of steel balls 34 each trapped in a hole 35 formed in the sliding cylindrical ring 29, the holes being spaced circumferentially around the ring 29. A corresponding number of correspondingly spaced recesses or dimples 36 are formed around the outer surface of the outer spindle member 19, and the balls 34, which are of larger diameter than the thickness of the ring 29, can be held in locking engagement with these dimples 36 by means of a cylindrical locking sleeve 37 surrounding the sliding ring 29. When the balls 34 are so held by the locking sleeve 37 in engagement with the dimples 36, they prevent the axial movement of the sliding ring 29, and of the inner spindle member 22 secured to it by the transverse pin 27, relatively to the outer spindle member 19. However the locking sleeve 37 is also formed with a series of spaced circumferential holes or recesses 38 into which the balls 34 can move radially outwardly when the locking sleeve 37 is moved axially outwardly along the spindle 18 to its release position. The outward radial movement of the balls 34 into the holes or recesses 38 of the locking sleeve 37 frees the sliding ring 29 and the inner spindle member 22 pinned to it, to allow the return spring 30 to retract the inner spindle member 22 from engagement with the rotor shaft by telescoping it within the outer spindle member 19. A catch biassing compression spring 39 of helical form surrounds the outer spindle member 19 within the locking sleeve 37, and acts between an inturned flange 40 at the inner end of the sleeve 37 and the edge of the sliding ring 29 to bias the locking sleeve 37 out of its release position.

To release the ball catch 33 at a desired moment after the spindle 18 has spun the rotor 10 up to a suitable speed of rotation, a release nut 41 is provided which is threaded on to an external screwthread 42 formed on the outer spindle member 19, which of course rotates with the inner spindle member 22 as the rotor is being spun. A finger (not shown) projecting from the release nut 41 engages against a fixed abutment surface of a member secured to the gyroscope casing 15 so as to prevent the rotation of the release nut 41 with the spindle 18. The outer spindle member 19 will consequently rotate relatively to the release nut 41 and will thus screw the latter along the co-operating screwthreads 42 in the axial direction away from the rotor 10 and towards the locking sleeve 37. When the release nut 41 reaches the locking sleeve 37, further rotation of the spindle 18 will cause the nut 41 to move the sleeve 37, along the spindle 18 against the force of the catch biassing spring 39, until eventually the sleeve 37 reaches its release position in which it releases the ball catch 33 and allows the retraction of the inner spindle member 22 by the return spring 30. The precise number of revolutions of the spindle 18 required to release the ball catch 33 will of course depend on the starting position of the release nut 41 on the screwthreads 42.

To enable the release nut 41 to be moved back towards the starting position, and to enable its starting position to be preset in accordance with the number of revolutions of the spindle required before release, a slot 44 is formed in the head of the outer spindle member at its outer end to receive a screw-driver, by which the whole spindle 18 can be rotated to screw the release nut 41 backwards or forwards on its thread 42. Moreover, the hollow outer spindle member 19 is formed with an aperture 45 at its outer end, enabling a tool such as a screw-driver or rod to be inserted for pushing the inner spindle member 22 back into its advanced position in engagement with the rotor shaft 23 against the force of the return spring 30, prior to the locking of the ball catch 33.

A simple pneumatic motor indicated generally at 47 is provided for effecting the rotating of the spindle 18 required to spin the gyroscope rotor 10 up to speed. This motor comprises a cylinder 48 containing a piston 49 which slides on two longitudinal parallel guide rods 50 extending between two end caps 51 and 52 of the cylinder 48 and spaced from the cylinder axis 53. Each guide rod is formed with a head 54 at one end and is screw-threaded at its other end and provided with a clamping nut 55, so that it serves to clamp the two cylinder end caps 51 and 52 to the wall of the cylinder 48. The inner cylinder end cap 51 is formed as a part of the gyroscope casing 15 whilst the outer end cap 52 carries a projecting bracket 56 on which the outer bearing 20 for the spindle 18 is mounted, these various parts being held in their assembled relationship by the clamping action of the guide rods 50, with the cylinder 48 disposed alongside the outer spindle member 19. A rotatable shaft 58 formed with a quick screw-thread 59 extends coaxially through the pneumatic cylinder 48 and is journalled at its ends in bearings 60 and 61 mounted in the cylinder end caps 52 and 51. The outer end of the threaded shaft 58 protrudes through the end cap 52 and carries outside the cylinder 48 a gear wheel 62. A co-operating gear wheel 63 having a smaller number of teeth is mounted on the outer end of the spindle member 19 and engages with the gear wheel 62, the two constituting step-up gearing whereby rotation of the threaded shaft 58 produces correspondingly more rapid rotation of the spindle 18 parallel to which the shaft 58 extends.

The piston 49 carries at its central portion a driving nut 66 which is secured to the piston and is threaded on to the quick-threaded shaft 58. Compressed air can be admitted from an air bottle carried in the missile to one side of the piston 49 in the cylinder 48 to drive the piston along the cylinder, but as rotation of the piston and of the nut 66 secured to it is prevented by the two guide rods 50, such movement of the piston will cause the rotation of the threaded shaft 58 and thus will transmit a spinning torque to the rotor 10 via the step-up gearing 62, 63 and the spindle 18.

To cushion the piston 49 when it reaches the end of its outward stroke a resilient sealing pad 67 is mounted within the cylinder against the end cap 52.

In practice it has been found that if the quickthread 59 has a pitch producing about six revolutions of the shaft 58 during the stroke of the piston 49 in the outward direction, and if the step-up gear ratio is suitably chosen, then it is possible by admission of compressed air at suitable pressure to the inner end of the cylinder to spin the rotor up to a speed of 8,000 revolutions per minute from standstill in ⅛ of a second. When the piston approaches the end of its travel the release nut 41 will automatically engage the spindle locking sleeve 37 to cause it to release the ball catch 33, so that the inner end 22 of the spindle is then withdrawn clear of the gimbal operating space leaving the rotor 10 spinning at the required speed.

Figure 4:
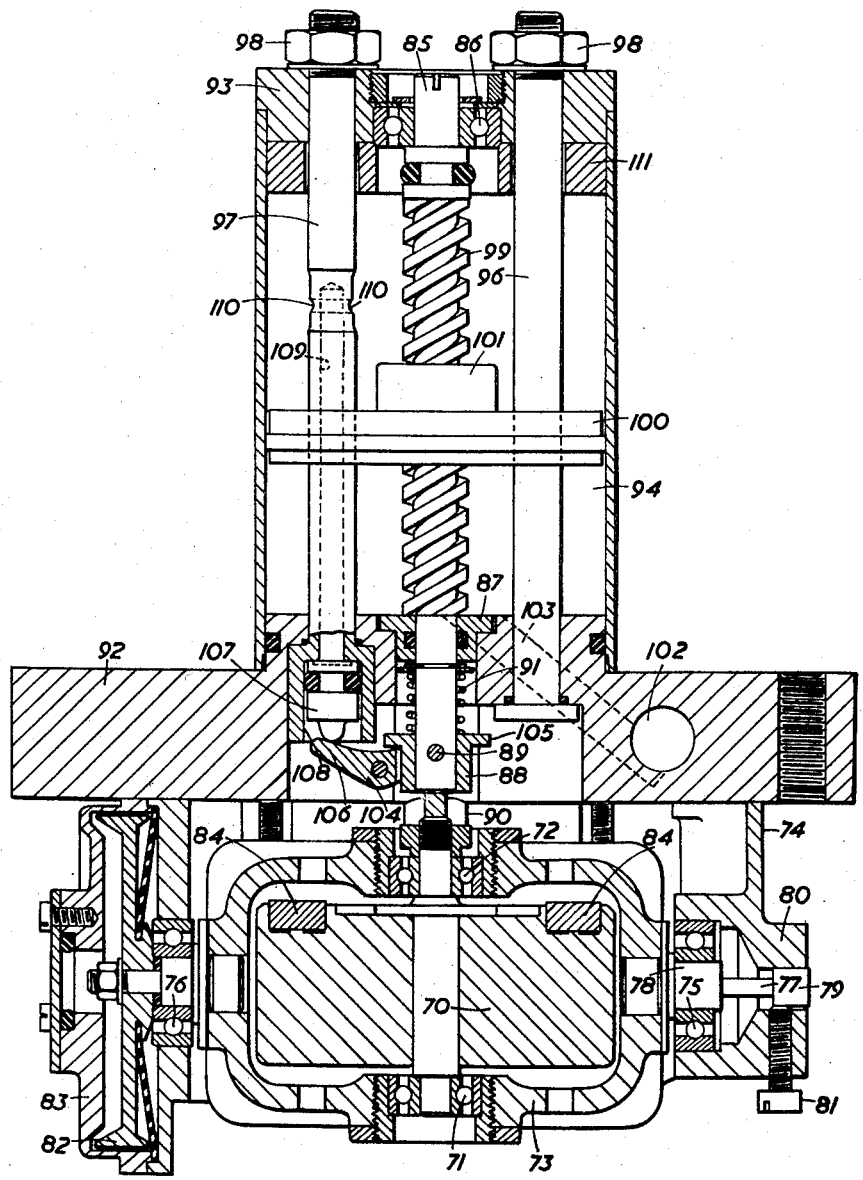
Figure 4 is a sectional view of a modified construction of gyroscope assembly.

In the second embodiment of the invention illustrated in Figure 4, the gyroscope rotor 70 is pivotally mounted in bearings 71, 72 in a single gimbal ring 73, which is pivoted in the casing 74 of the gyroscope about an axis at right angles to the rotor axis by means of bearings 75 and 76. At one end the gimbal ring 73 is restrained by a torsion bar 77 one end of which is connected to the gimbal shaft 78, and the other end of which carries a head 79 locked in a housing 80 by means of a bolt 81. The other end of the gimbal shaft 78 is connected to a damping disc 82 contained in a damping cup 83 for frictionally damping the rotation of the gimbal ring 73 which is resiliently constrained by the torsion bar 77.

The gyroscope rotor is provided with magnetic inserts 84 in one face which co-operate with stationary electrical pick-off coils (not shown), to provide an electrical pick-off signal which will be a measure both of the rotor speed and of the angular deflection of the gimbal frame 73 against the elastic restoring couple afforded by the torsion bar. Thus, since the component of the rate of turn of the missile or craft in which the gyroscope is mounted, in the plane transverse to the pivotal axis of the gimbal ring 73, will be proportional to the angular deflection of the gimbal ring 73 from its equilibrium position against the elastic restoring couple of the torsion bar, this component of the rate of turn will be represented by the magnitude of the electrical pick-off signal, for a given rotor speed. The use of magnets carried by a gyroscope rotor for co-operation with separate electrical pick-off coils to provide an electrical pick-off signal is the subject of the present applicants' United States of America patent application Serial No. 388,036 (Case No. 311).

In this embodiment the spindle 85 is mounted in bearings 86 and 87 so that it can be rotated coaxially with the rotor shaft. The spindle carries on its inner end a dog clutch member 88 which is slidably mounted on it but is caused to rotate with it by a driving pin 89 whose ends extend into longitudinal slots formed in the member 88. The latter is spring-pressed towards a position of engagement with a co-operating dog clutch member 90 mounted on the shaft of the rotor 70, by a helical compression spring 91 surrounding the spindle 85. The inner spindle bearing 87 is mounted in a baseplate 92 to which the supports for the gimbal bearings 75 and 76 are secured, and the outer spindle bearing 86 is mounted on the outer end cap 93 of a pneumatic cylinder 94 which is clamped to the base plate 92 coaxially with the spindle 85 by means of two spaced guide rods 96 and 97 provided with clamping nuts 98 at their screwthreaded outer ends. In this case the spindle itself is formed with a quick-threaded lead screw thread 99, and a piston 100 slidably mounted on the guide rods 96 and 97 carries a correspondingly screw-threaded driving nut 101 which is threaded onto the lead screw 99. Compressed air is admitted from an air bottle through a tunnel 102—103 in the base plate into the inner internal end of the cylinder 94 to drive the piston outwardly, thereby rotating the spindle 85 to spin the rotor 70 via the dog clutch.

To disengage the dog clutch when the rotor has been spun up to speed, a pivoted fork 104 is provided which embraces the sliding dog clutch member 88 and engages beneath a flange 105 formed on it. The tail 106 of the fork 104 is engaged by a pneumatic plunger 107 in a cylinder 108 formed at the end of one guide rod 97. The latter is also formed with a longitudinal bore 109 communicating at its inner end with the interior of the cylinder 108 and at its outer end with ports 110 formed in the side of the guide rod 97 at a point about two thirds along its length. Thus when the piston during its outward stroke reaches and uncovers the ports 110, compressed air passes from the inner end of the cylinder 94 through the ports 110 and through the bore 109 into the cylinder 108, thereby causing the plunger 107 to move inwardly and rock the fork 104 which will retract the dog clutch member 88 out of engagement with the co-operating member 90 against the action of the return spring 91, to free the spindle 85 from the spinning rotor 70. As before a buffer pad 111 is provided in the outer end of the cylinder 94 to cushion the piston 100 at the end of its outward stroke, and the exposed outer end of the spindle 85 is slotted at 112 for engagement with a tool such as a screw-driver for the purpose of rotating the spindle to wind the piston 100 back to its inner position in the cylinder 94.

What we claim as our invention and desire to secure by Letters Patent is:

1. Mechanism for spinning a gimbal-mounted gyroscope rotor up to speed which comprises an axially movable rotary clutch member mounted coaxially with the rotor in bearings so positioned as to permit the clutch member to be advanced into coupling engagement with the rotor, means for rotating the clutch member when so coupled to spin the rotor, the said means comprising a pneumatic cylinder, a lead screw mounted coaxially within the cylinder and having a quick screw thread, a correspondingly threaded driving nut threaded on to the lead screw, a piston slidable in the cylinder and secured to the nut whereby axial movement of the piston in the cylinder rotates the lead screw, means for preventing the rotation of the nut in the cylinder about the axis of the lead screw, coupling means between the lead screw and the clutch member, the said coupling means transmitting rotation of the lead screw to the clutch member but incorporating a lost-motion sliding connection permitting the axial movement of the clutch member into and out of clutching engagement with the rotor, means for admitting compressed air into the cylinder on one side of the piston to drive the piston along the cylinder to rotate the lead screw and the clutch member with the latter coupled to the rotor, and automatic retraction means acting on the clutch member to retract it from the rotor when the latter has been run up to speed, the retraction means being responsive to the movement of the piston in the cylinder for automatic actuation thereby to retract the clutch member from the rotor on the arrival of the piston at a predetermined point adjacent the end of its stroke in the cylinder.

2. Mechanism as claimed in claim 1 in which the lead screw extends alongside and parallel to the axis of the clutch member, and which includes torque-transmitting gearing coupling the lead screw to the spindle.

3. Mechanism as claimed in claim 2 in which the retracting means for the spindle comprises a catch capable of being locked by a movable locking member in a position in which it holds the end of the clutch engaged coaxially with the rotor against the action of return spring means, and a screwthreaded release member caused to move axially along a co-operating screwthread by relative rotation produced by the rotation of the clutch, such axial movement of the release member being arranged to move the locking member into its release position to release the catch after a predetermined number of revolutions of the clutch, so as to allow the return spring means to retract the clutch from the rotor.

4. Mechanism as claimed in claim 3 in which the catch comprises a ball catch capable of being locked by an axially movable external locking sleeve surrounding the clutch, and in which the release member comprises a nut threaded onto an external screwthread formed on the clutch, the nut being itself prevented from rotation but free to be moved in the axial direction relatively to the clutch by rotation of the clutch to cause it to engage the locking sleeve and move the latter along the clutch into its release position in which it releases the ball catch.

5. Mechanism as claimed in claim 1 in which the pneumatic cylinder and the lead screw are mounted coaxially with the clutch member, and which includes in the cylinder longitudinal guide rods spaced from the cylinder axis, the piston being slidable on the guide rods but being prevented from rotation about its axis by them.

6. Mechanism as claimed in claim 5 in which the retracting means comprises a pneumatic plunger arranged when actuated to withdraw the clutch from the rotor, and return spring means opposing the action of the plunger.

7. Mechanism as claimed in claim 6 in which the plunger acts on one end of a pivoted lever member whose other end engages a flange on the clutch, whereby the actuation of the plunger rocks the lever to retract the clutch.

8. Mechanism as claimed in claim 7 including a port which is arranged to be uncovered by the piston at a predetermined point in its stroke and thereby exposed to the compressed air in the cylinder, and a conduit leading from the port to the pneumatic plunger.

9. Mechanism as claimed in claim 8 in which the port is formed in the side wall of one of the guide rods on which the piston slides, the said guide rod being also formed with a longitudinal bore constituting the said conduit.

10. Mechanism as claimed in claim 1 in which the clutch is formed in two parts which telescope longitudinally one on the other, namely an end portion capable of being extended telescopically from the remaining portion into coupling engagement with the rotor and of being retracted therefrom by the retracting means.

11. Mechanism as claimed in claim 10 including a dog clutch one member of which is carried by the said end portion of the spindle and the cooperating part of which is carried by the rotor.

References Cited in the file of this patent

UNITED STATES PATENTS

| | | |
|---|---|---|
| 617,762 | McCollum | Jan. 17, 1899 |
| 814,969 | Leavitt | Mar. 13, 1906 |
| 829,279 | Mears | Aug. 21, 1906 |
| 1,173,435 | Jones | Feb. 24, 1909 |
| 925,710 | Leavitt | June 22, 1909 |
| 1,072,701 | Collins | Sept. 9, 1913 |